No. 727,773. PATENTED MAY 12, 1903.
A. A. FICKENSCHER.
DOUBLE-ACTING PNEUMATIC BRAKE.
APPLICATION FILED NOV. 3, 1902.
NO MODEL.
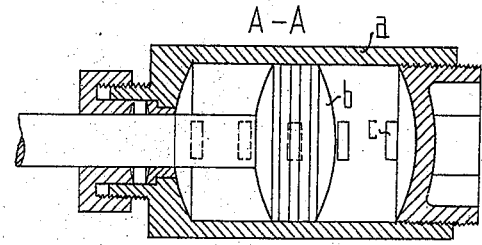
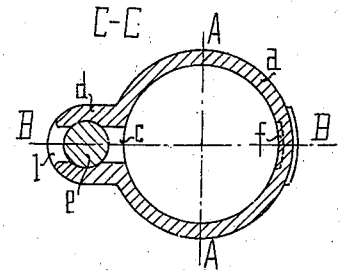
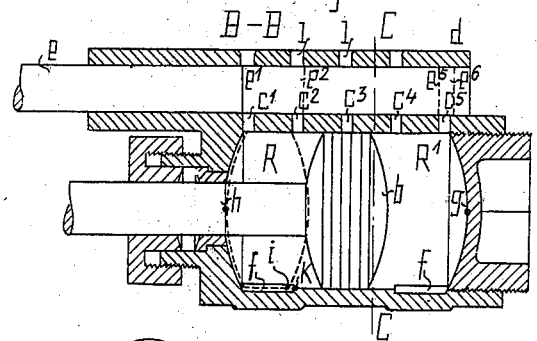
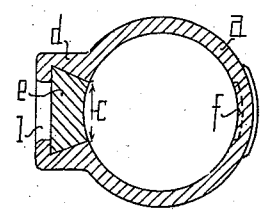
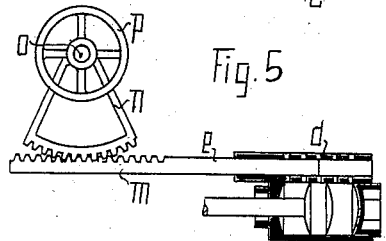
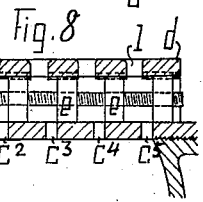
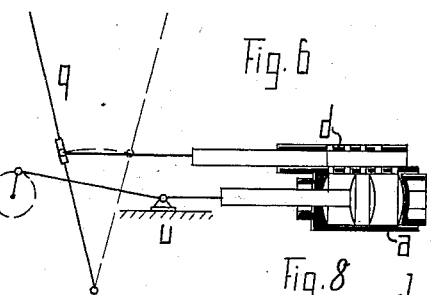
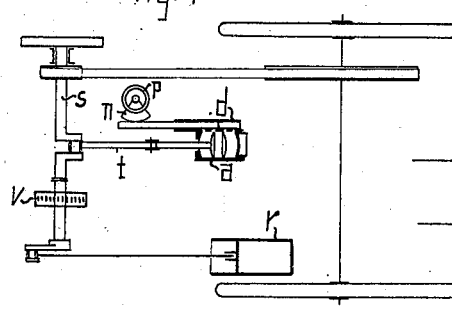
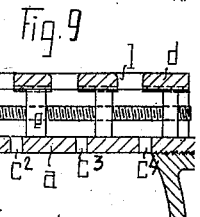
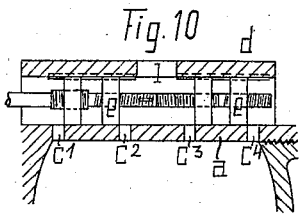
Witnesses:
fritz Kritzenthaler
Oscar Bock
Inventor:
Alfred Andrew Fickenscher
Attorney:
Hugo Abt.

No. 727,773. Patented May 12, 1903.

UNITED STATES PATENT OFFICE.

ALFRED ANDREAS FICKENSCHER, OF MUNICH, GERMANY.

DOUBLE-ACTING PNEUMATIC BRAKE.

SPECIFICATION forming part of Letters Patent No. 727,773, dated May 12, 1903.

Application filed November 3, 1902. Serial No. 129,971. (No model.)

*To all whom it may concern:*

Be it known that I, ALFRED ANDREAS FICKENSCHER, a subject of the King of Bavaria, residing at Munich, Kingdom of Bavaria, Germany, have invented a Double-Acting Pneumatic Brake, of which the following is a specification, reference to be made to the drawings accompanying and forming a part of the same.

The property of gas, by which the pressure may be by compression increased, is much used in engineering—for instance, with steam-engines and explosion-motors—and also in other ways—for instance, by mountain-railways, where the steam-cylinder is used as brake in the downhill drive. The effect is here naturally imperfect, as the cylinder is serving two purposes. As a brake it only can be considered in secondary way. The regulation also is a very limited one. The steam-cylinder acts only as a single-acting brake, for while the volume of the cylinder is compressed on the one side of the piston it is on the other not rarefied, but receives here fresh air from outside. Express direct and double acting brakes are not known as yet.

Considering the invention in question, the idea has been to obtain a double-acting pneumatic brake with regulation in a very high degree to be applied by the direct coupling as well for automobiles, locomotives, lifts, &c.

The invention is represented in Figures 1 to 11.

Fig. 1 shows a vertical section to A A through the working cylinder; Fig. 2, a cross-section to C C; Fig. 3, a horizontal section to B B. Fig. 4 represents an execution form of the distributing-piston; Figs. 5 and 6, execution forms for the motion of the distributing-piston; Fig. 7, an application on an automobile; Figs. 8 to 11, realization forms for the distributing-piston.

In Figs. 1 to 4, $a$ is a cylinder, the ends of which are closed and in which the piston $b$ moves hermetically. In the walls of the cylinder $a$ are air-slits $c'$ $c^2$ $c^3$, &c., placed connecting the cylinder $d$, of which one end is open and having a piston moving hermetically in it. Piston $b$ is in a direct way joined with the driving-shaft by means of a connecting-rod and a crank. The piston $e$ is adjusted by means of a lever or rack, cog, and hand-wheel, &c. Besides, are placed in the cylinder $a$ cavities $f$, allowing an exchange of pressure in front and behind the piston in its end positions.

In the position of the piston $e'$ drawn in Fig. 3 the air may escape or enter by means of the slits $c$ if the piston $b$ is going to and fro, according as the air is compressed or rarefied. In this case only the resistance to friction is to be overcome.

If the piston $e$ is brought in the position $e^5$, Fig. 3, the air is compressed by the motion of the piston $b$ from point $g$ to $h$, and thus gained a brake in the direction of motion. If the point $i$ of the piston $b$ has got over the point $k$ of the cavity $f$, (position $i'$,) then the compressed air is entering behind the piston and escapes through the slit $c^5$ into the open air. The piston returning from $h$ to $g$, the remaining air is rarefied in the space R, whereby likewise a brake is produced by means of the back pressure on the piston, but which is less than the first.

The greatest brake effect is gained when the piston $e$ is placed near the point $e^6$, so that the slits $c$ are all covered and the air in space R' is rarefied and at the same time compressed by the motion of the piston from $g$ to $h$. In the end position the pressures equalize themselves by means of the cavity $f$. On going back from $h$ to $g$ the occurrence is similar. In the space R the air is rarefied. In R' the air is compressed. By applying the cavities $f$ the brake becomes double acting. Without them it would be only single acting. Between these two extreme cases, the waste-weir and the highest brake effect, may be obtained many different graduations in the brake effect if further slits $c'$ $c^2$, &c., are applied in the cylinder-mantle. Piston $e$ being near $e^2$, for example, the air is compressed only from $e^2$ if the piston is going from $g$ to $h$, and so on. The effect of the brake is accordingly less. The position of the piston $e$ (with respect to its end situations) at the closing the slits $c$ by means of the piston $e$ is quite indifferent for the brake effect. As on a compression by which the air grows warm an air rarefaction is always following, which is connected with a heat withdrawing, the cylinder never gets too hot, and one may therefore abstain from a water-injection. The compression is to be gained more or less great, according as the noxious space in the cylinder is measured. For obtaining an exact regulation the ends of the cylinder can be screwed in. (In Figs. 1 and 2 only one end of the cylinder is designed to be screwed in, because the regulation on the other end may be procured, for instance, on the crosshead $u$ of the piston-rod.) Hereby the latter can alike be parts of the frame on automobiles, locomotives, &c., which would allow to omit a special fixing of the cylinder. Accordingly as the cylinder ends are screwed in and according to the position of the piston $e$ it is possible to obtain nearly independent of the piston diameter a brake effect to the immediate stopping of the machinery, the carriage, the locomotive can only glide.

Instead of forming the distributing-piston round, as represented in Fig. 2, one may give it also a trapeze form, Fig. 4.

The slits $l$ in the cylinder $d\,v$, Figs. 1 to 4, are not directly necessary, but nevertheless they facilitate the realization of the slits $c$ and allow the air to enter and escape quickly.

In Figs. 8 and 9 the distributing-piston $e$ is realized in another kind. Instead of forming the same in one piece one may construct it also in several parts. According to the disposition of the slits $c$ the most different degrees can be obtained.

By means of the division of the piston $e$, in the first place, one gains a shortening of the piston's stroke, which gives a great advantage in the management of the brake. In the second instance a smoother brake is effected. Supposing that the part-pistons $e$ be on a male screw led by means of a key-groove and key, Fig. 8, the movement can also take place as represented in Figs. 5 and 6. They are moved by the twisting of the spindle over the slits. According to the covering of the slits $c$ the air may escape more or less rapid. The braking is therefore weaker or stronger. The highest effect appears again when all slits are covered. The braking becomes here more shock free than in the described manner of Figs. 1 to 4, where the brake effect is distributed only over certain parts of the cylinder. Instead of applying the slits $c$ in such a way that the part-pistons are cutting all off at the same time with the slits $c$ one can make the construction according to Fig. 9—that, for instance, the slit $c'$ gets first covered, thereafter slit $c^2$, and so on. The action is here similar to that described before according to Figs. 1 to 4, only a shortening of the piston-stroke is gained.

In Fig. 10 the piston motion is realized by means of a left and right handed screw. In this case one can likewise observe what is said already to Figs. 8 and 9.

The pistons instead of moving in one direction they move advancing toward each other in pairs or retreating from each other, according to the turning of the screw.

Fig. 11 represents another arrangement of the slits $c$, by which the trapeze-formed piston $e$ is applied. The effect is the same as described in Figs. 1 to 4, only a shortening of the piston-stroke is gained again. It is to be noticed here that also several slit series $c$ may be arranged around the cylinder $a$, and so, accordingly, several distributing-pistons $e$. On the whole there could be found a great many more of practicable forms. This also is to be said for the cavities $f$, which, for instance, may be improved as valves for the purpose to allow the compressed air to enter, perhaps by a maximal pressure, behind the piston $b$, &c.

In Fig. 5 the motion of the distributing-piston is performed by means of the rack $m$, the segment-toothed wheel $n$, the spindle $o$, and the hand-wheel $p$.

In Fig. 6 the distributing-piston motion is effected by means of the lever $q$.

Fig. 7 represents my brake applied on an automobile. $r$ is the cylinder of the motor; $s$, the crank-shaft, on which the connecting-rod of the brake-cylinder piston is attached. $v$ is a friction or brush clutch which is intended to uncouple the working motor-cylinder if the brake-cylinder shows a greater resistance than the first. The motor works then without load.

In case of danger one generally forgets to stop the working power, and in this case my pneumatic brake proves itself as an especially practical one, particularly for automobiles.

What I claim is—

1. In a brake of the type set forth, the combination with the working cylinder and the piston thereof, said cylinder having its wall formed with slits for its entire length, of a distributing-cylinder in communication with the openings of the first-named cylinder, a piston arranged in the last-named cylinder, and means for actuating the same for closing the said slits in the working cylinder, substantially as described and for the purpose specified.

2. The combination with the working cylinder and the distributing-cylinder in communication therewith, of pistons arranged in said cylinders, the piston of the first-named cylinder being formed with the teeth, a toothed segment engaging the toothed portion of the said piston, and a hand-wheel for operating the said segment, substantially as described and for the purpose specified.

Dated this 11th day of October, 1902.

ALFRED ANDREAS FICKENSCHER.

Witnesses:
 FRITZ KRITZENTHALER,
 OSCAR BOCK.